United States Patent Office 3,171,249
Patented Mar. 2, 1965

3,171,249
PROPELLANT AND ROCKET PROPULSION METHOD EMPLOYING HYDRAZINE WITH AMINO TETRAZOLES
Ronald E. Bell, Canoga Park, Calif., assignor to North American Aviation, Inc.
No Drawing. Filed Nov. 29, 1961, Ser. No. 155,803
8 Claims. (Cl. 60—35.4)

This invention relates to a novel rocket propellant. More particularly, this invention relates to a novel improved rocket propellant and a method of operating a rocket engine.

The criterion by which rocket propellants are classified is specific impulse, $I_s$, defined as thrust in pounds divided by the total mass flow of fuel and oxidizer in pounds per second. Specific impulse is thus given in units of "seconds." Oxidizer-fuel propulsion system compositions with a relatively high specific impulse are known in the art. Such systems, however, quite often employ a non-storable oxidizer such as liquid oxygen, for example. The non-storability of certain rocket propellant components results in a tactical disadvantage providing rockets which can not be held in a full state of instantaneous readiness. Consequently, a search has centered on development of a high energy, storable, liquid system which is invariably hypergolic (spontaneously combustible on fuel-oxidizer contact), and that remains so even at very low pressures and temperatures. For example, hydrazine, $N_2H_4$, is a well-known rocket fuel. Chlorine trifluoride, $ClF_3$ is a storable oxidizer. In order to derive the greatest possible benefit from using an oxidizer with an extremely wide liquid range such as chlorine trifluoride, the fuel itself should have a correspondingly large liquid range. In this case, hydrazine must be eliminated due to its relatively high freezing point. Therefore, a need exists for a fuel having a low freezing point and a high specific impulse when used with a storable oxidizer.

Previously, in order to obtain a fuel with a wide liquid range, a sacrifice has been made in the density impulse of the fuel, $I_d$, which is defined by the formula:

$$I_d = I_s \times \frac{(MR+1)}{\left(\frac{MR}{d_o}+\frac{1}{d_f}\right)}$$

wherein MR (mixture ratio) = ratio of the oxidizer consumption rate to the fuel consumption rate.

$d_o$ = density, oxidizer, g./cc.
$d_f$ = density, fuel, g./cc.

The density impulse of a fuel is an important factor in the design of a missile system because it indicates the impulse obtainable from a given volume of fuel. Since the volume capacity of a missile is limited, it is thus obviously desirable to obtain the highest impulse from a given volume of the fuel. Hydrazine has a relatively high density impulse. As a result, it is desirable to maintain or approximate this high density impulse of hydrazine in addition to lowering its freezing point while keeping the specific impulse high.

It is an object of this invention to provide a new hydrazine-based fuel. Another object of this invention is to provide a storable rocket fuel or composition possessing a high specific impulse. It is also an object of this invention to provide a storable rocket fuel. A further object of this invention is to provide a rocket fuel composition having a low freezing point. One other object of this invention is to provide a novel rocket fuel having a high density impulse. A still further object of the invention is to provide a method of operating a liquid fuel rocket engine. The above and other objects of this invention will become apparent from the discussion which follows.

The objects of this invention are accomplished by the use of compounds having the general formula:

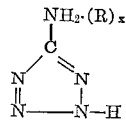

wherein $x$ varies from 0 to 1 and R is selected from the class consisting of HCl, $H_2O$, $HNO_3$, and $HClO_4$, as additives to a hydrazine-based rocket fuel in an amount sufficient to depress the freezing point at least 40° C. while retaining about the same density impulse and specific impulse. Hence, an embodiment of this invention comprises a method of operating a rocket engine comprising ejecting from the reaction chamber of the engine a gaseous product produced by a spontaneous combustion of an oxidizer and hydrazine-based fuel having therein a salt of 5-amino tetrazole, said fuel and oxidizer being injected in separate streams into the combustion or reaction chamber.

More particularly, the invention concerns a rocket fuel comprising from about 65 to about 80 weight percent hydrazine and from about 20 to about 35 weight percent of a 5-amino tetrazole or salt thereof. A more preferred composition having particularly high density impulse is one having from about 68 to about 72 weight percent hydrazine and from about 28 to about 32 weight percent of 5-amino tetrazole or salt thereof. In order to improve the low temperature viscosity behavior of the hydrazine-based fuel containing the salt of 5-amino tetrazole, a small amount of monomethyl hydrazine, MMH, may be added to the fuel composition. It is found to be particularly advantageous to add from about 2 to 25 weight percent of the monomethyl hydrazine to the fuel composition of this invention. Thus, a typical fuel of this invention contains 50–70 weight percent hydrazine, 20–35 weight percent of a salt of 5-amino tetrazole and 0–25 weight percent monomethyl hydrazine.

Various liquid oxidizers may be used in combination with the hydrazine fuel containing the additives of this invention. Non-limiting examples of the various oxidizers which may be used include: fluorides which may be bromine pentafluoride, chlorine trifluoride, perchloryl fluoride, bromine monofluoride, bromine trifluoride, chlorine monofluoride, iodine pentafluoride, nitrogen fluoride, nitrosyl fluoride, nitryl fluoride, nitrogen trifluoride, oxygen difluoride; oxides including hydrogen peroxide, tetroxide, nitric oxide, nitrogen dioxide, chlorine dioxide, chlorine heptoxide, chlorine hexoxide, chlorine monoxide, nitrous oxide, sulfur dioxide, nitrogen trioxide; chlorides which may be bromine chloride, iodine chloride, nitrogen trichloride, nitrosyl chloride, phosphorous oxychloride, selenium oxychloride, pyrosulfurychloride; halogens including fluorine, chlorine, bromine; carboxylic acids which may be caproic acid, acetic acid, formic acid, butyric acid, lactic acid, acrylic acid; additional oxidizers are oxygen difluoride, nitric acid, oxygen, ozone, tetranitramethane, tetrafluorohydrazine, hydrogen sulfide, bromoazide, perchloric acid, chlorine azide, chlorosulfonic acid, difluorophosphoric acid, hexafluorophosphoric acid, fluorosulfonic acid, hydrogen bromide, nitrosyl bromide, phosphoric acid, pyrophosphoric acid, selenic acid.

EXAMPLE I

A hydrazine fuel composition of this invention was made by preparing a mixture of 65 percent hydrazine, 6 percent by weight monomethyl hydrazine and 29 percent by weight 5-amino tetrazole hydrate. The three components were simply stirred together at ambient conditions. It makes no difference as to what order the compounds are added to each other in preparing the mixtures of the invention. The density of the foregoing fuel composition at 68° F. was 1.1261 g./cc. The freezing point was −53° C.

EXAMPLE II

Various hydrazine-based fuel compositions were prepared adding thereto monomethyl hydrazine and 5-amino tetrazole hydrate. In addition, other hydrazine fuel compositions containing compounds similar to the 5-amino tetrazole hydrate were prepared. Surprisingly, it was discovered that the aforementioned closely related compounds did not significantly lower the freezing point. The results are shown in the following Table I.

*Table I*

| Composition | Weight Percent | Freezing Point, °C. |
|---|---|---|
| 1. $N_2H_4$ | 100.00 | +2.0 |
| 2. $N_2H_4$ | 65.76 | −15.6 |
| Nitroguanidine | 34.24 | |
| 3. $N_2H_4$ | 63.72 | −25.5 |
| 5-Amino 1, 3, 4, Triazole | 36.28 | |
| 4. $N_2H_4$ | 77.14 | −5.8 |
| Carbohydrazide | 22.86 | |
| 5. $N_2H_4$ | 62.70 | −79.0 |
| 5-Amino Tetrazole Hydrate | 37.30 | |
| 6. $N_2H_4$ | 65.00 | −53.0 |
| Monomethyl Hydrazine | 6.00 | |
| 5-Amino Tetrazole Hydrate | 29.00 | |

EXAMPLE III

Two mixtures of hydrazine, monomethyl hydrazine and 5-amino tetrazole hydrate were prepared. The freezing point for the solutions was found and the theoretical specific impulse was determined. The parameters used in theoretically determining a specific impulse was 1000 p.s.i. chamber pressure expanded to 14.7 p.s.i.a., shifting equilibrium and chlorine-trifluoride as the oxidizer. The results as compared to fuels of 100 percent hydrazine and 100 percent of unsymmetrical dimethyl hydrazine, UDMH, are presented in Table II.

*Table II*

| Composition | Weight Percent | Density | Freezing Point, °C. | Theoretical Performance (sec.) | |
|---|---|---|---|---|---|
| | | | | $I_s$ | $I_d$ |
| 1. $N_2H_4$ | 65 | 1.1261 | −53 | 285.5 | 439.8 |
| 5-Amino Tetrazole·$H_2O$ | 29 | | | | |
| MMH | 6 | | | | |
| 2. $N_2H_4$ | 55 | 1.0650 | −40 | 286.0 | 431.4 |
| 5-Amino Tetrazole·$H_2O$ | 21 | | | | |
| MMH | 24 | | | | |
| 3. UDMH | 100 | .78 | −57 | 280.0 | 388.0 |
| 4. $N_2H_4$ | 100 | 1.00 | +2 | 294.0 | 444.0 |

As can be seen from the foregoing Table II, the compositions of this invention including the 5-amino tetrazole hydrate significantly lowered the freezing point while maintaining a relatively high specific impulse and density impulse. Though the latter two values are not quite as high as that of hydrazine by itself, it should be noted that the compositions are particularly valuable since they may be utilized over a much wider range of temperatures without greatly sacrificing performance. UDMH is presently being used as a fuel because of its low freezing point. However, as clearly shown in the table, UDMH possesses a low specific impulse and an extremely low density impulse as compared to the fuels of the instant invention. Thus, fuels may be prepared in accordance with this invention which have as good storability as UDMH and definitely superior performance properties. Similar results will be obtained by using the other salts of 5-amino tetrazole such as 5-amino tetrazole nitrate, 5-amino tetrazole hydrochloride and 5-amino tetrazole perchlorate.

EXAMPLE IV

Various compositions containing 5-amino tetrazole and salts thereof were prepared in accordance with this invention. The following Table III illustrates some of these compositions that were prepared.

*Table III*

| Composition compounds: | Weight percent |
|---|---|
| (1) 5-amino tetrazole-hydrate | 20 |
| Hydrazine | 80 |
| (2) 5-amino tetrazole-nitrate | 30 |
| Hydrazine | 70 |
| (3) 5-amino tetrazole-perchlorate | 35 |
| Hydrazine | 65 |
| (4) 5-amino tetrazole | 20 |
| Hydrazine | 55 |
| Monomethyl hydrazine | 25 |
| (5) 5-amino tetrazole hydrochloride | 25 |
| Hydrazine | 65 |
| Monomethyl hydrazine | 10 |
| (6) 5-amino tetrazole hydrate | 25 |
| Hydrazine | 73 |
| Monomethyl hydrazine | 2 |

EXAMPLE V

The novel fuel compositions of this invention may be utilized in conventional liquid propulsion rocket engines. Thus, an embodiment of this invention involves a method of operating a conventional liquid rocket engine utilizing as a fuel, therefore, the herein compositions. A conventional liquid engine system as described on page 9 of the book "Rocket Propulsion Elements" by George P. Sutton (1949) published by John Wiley & Sons, New York, comprises storage means for the fuel and oxidizer used, an outer casing defining an engine chamber, the casing having on the downstream end thereof an exhaust nozzle and an injector means situated on the upstream casing. A conventional supply means supplies the fuel and oxidizer from the storage tanks to the injector head. The method of operating such an engine would comprise storing the fuel and oxidizer in the separate means provided, feeding them to the injector head from where they are injected into the combustion chamber in separate streams to be intimately mixed and ignited because of their hypergolicity and ejecting from the exhaust nozzle portion of the engine the combustion gases to create the desired useful thrust. In such a method of operation, chlorinetrifluoride may be stored as the liquid oxidizer while the fuel composition may typically be 65 weight percent hydrazine, 6 weight percent monomethyl hydrazine and 29 weight percent 5-amino tetrazole hydrate. The above method of operating a liquid fuel rocket engine may embrace the use of the various fuel compositions aforementioned encompassed within the herein invention. Thus, a liquid rocket engine may be operated utilizing chlorine trifluoride as an oxidizer and a fuel composition having 75 weight percent hydrazine and 25 weight percent 5-amino tetrazole perchlorate. It should be noted that with some oxidizers, there is no hypergolic effect and thus the fuel-oxidizer mixture must be ignited by conventional means such as an electrical spark.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A composition of matter comprising:
  hydrazine, and
  a sufficient amount, to depress the freezing point of hydrazine at least 40° C., of a compound having the general formula:

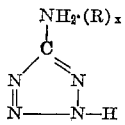

wherein
x varies from 0 to 1 and
R is selected from the class consisting of HCl, H₂O, HNO₃ and HClO₄.

2. A composition of matter comprising:
65–80 weight percent hydrazine
20–35 weight percent of a compound having the general formula:

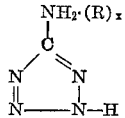

wherein
x varies from 0 to 1 and
R is selected from the class consisting of HCl, H₂O, HNO₃ and HClO₄.

3. A composition of matter comprising:
68–72 weight percent hydrazine
28–32 weight percent of a compound having the general formula:

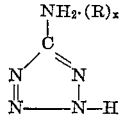

wherein
x varies from 0 to 1 and
R is selected from the class consisting of HCl, H₂O, HNO₃ and HClO₄.

4. A composition of matter comprising:
50–70 weight percent hydrazine
2–25 weight percent monomethylhydrazine
20–35 weight percent of a compound having the general formula:

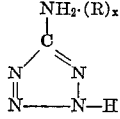

wherein
x varies from 0 to 1 and
R is selected from the class consisting of HCl, H₂O, HNO₃ and HClO₄.

5. A composition of matter comprising:
68–72 weight percent hydrazine
28–32 weight percent 5-amino tetrazole hydrate.

6. A composition of matter comprising:
50–70 weight percent hydrazine
2–25 weight percent monomethyl-hydrazine
20–35 weight percent 5-amino tetrazole hydrate.

7. A method of operating a liquid fuel rocket engine having
  a fuel and oxidizer storage means,
  a casing defining a combustion chamber,
  exhaust nozzle attached to the downstream end of said chamber,
  an injector means adjacent to the upstream end of said chamber, and
  means to supply the fuel and oxidizer to said injector means, said method comprising:
  placing in said fuel storage means hydrazine containing a sufficient amount to lower the freezing point thereof at least 40° C. of a compound having the general formula

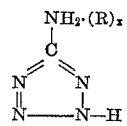

wherein
x varies from 0 to 1 and
R is selected from the class consisting of HCl, H₂O, HNO₃ and HClO₄,
placing in said oxidizer storage means a liquid oxidizer capable of oxidizing said fuel,
feeding said fuel and said oxidizer to said injector,
injecting said fuel and said oxidizer into said chamber,
igniting said fuel and said oxidizer causing combustion thereof and
ejecting combustion gases from said exhaust nozzle to produce usable thrust.

8. The method of claim 7 wherein said fuel composition comprises
65–80 weight percent hydrazine and
20–35 weight percent of a compound having the general formula:

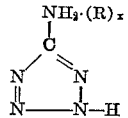

wherein
x varies from 0 to 1 and
R is selected from the class consisting of HCl, H₂O, HNO₃ and HClO₄.

References Cited in the file of this patent
UNITED STATES PATENTS
2,954,283  Horvitz _____ Sept. 27, 1960

OTHER REFERENCES
Rollbuhler et al. NASA—Technical Note D–131 (1959), pp. 1–16 incl.